No. 827,328. PATENTED JULY 31, 1906.
A. C. TAYLOR.
COMBINED COTTON PLANTER AND FERTILIZER DISTRIBUTER.
APPLICATION FILED JUNE 12, 1905.
2 SHEETS—SHEET 1.
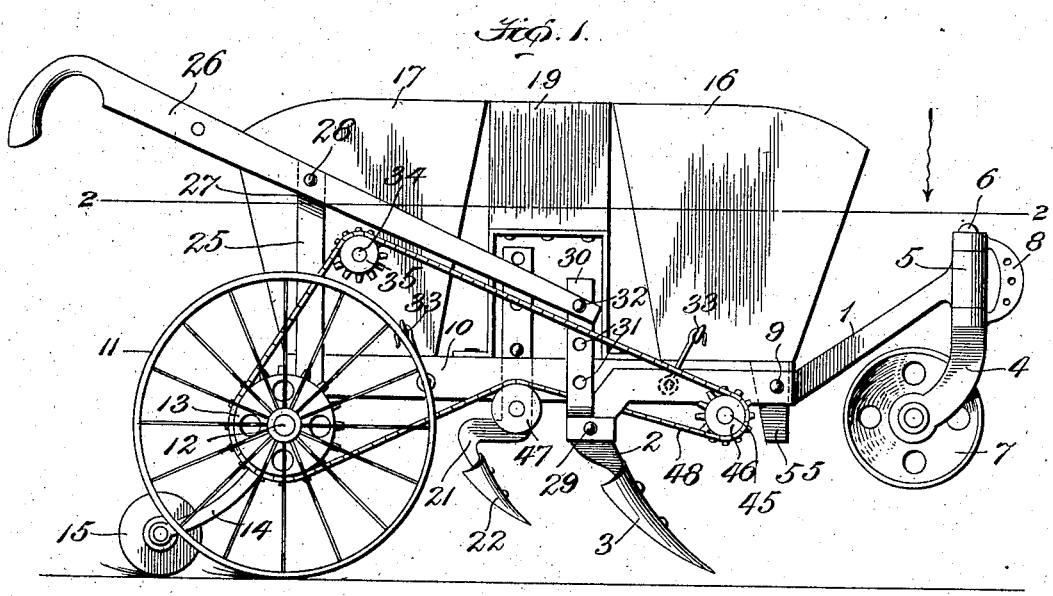
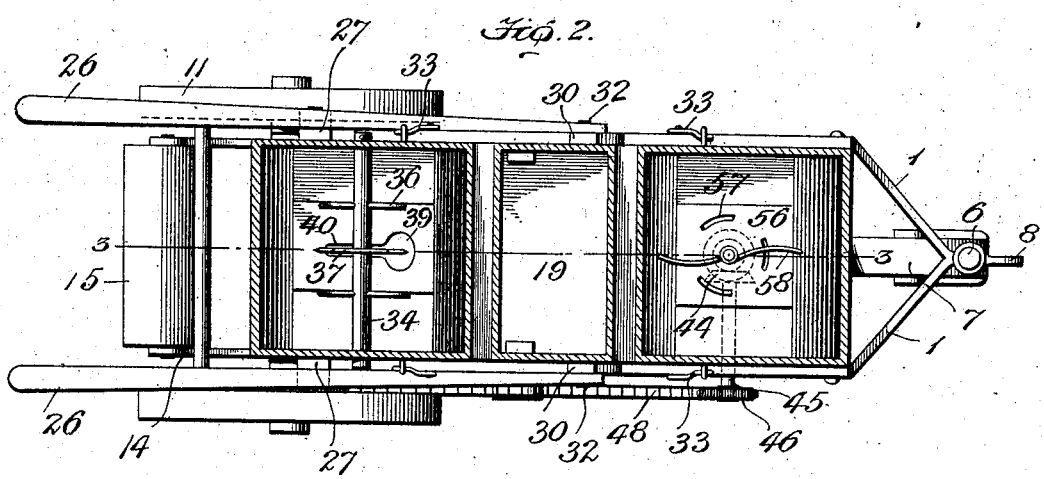
Witnesses:
Inventor:
Aiken C. Taylor
By W. S. Duvall
Attorney.
THE NORRIS PETERS CO., WASHINGTON, D. C.

No. 827,328. PATENTED JULY 31, 1906.
A. C. TAYLOR.
COMBINED COTTON PLANTER AND FERTILIZER DISTRIBUTER.
APPLICATION FILED JUNE 12, 1905.
2 SHEETS—SHEET 2.
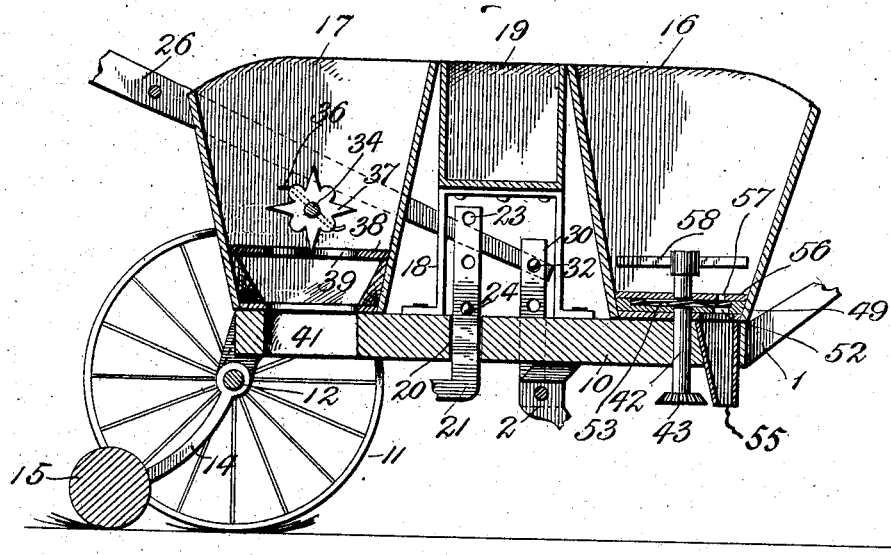

UNITED STATES PATENT OFFICE.

AIKEN C. TAYLOR, OF CHARLESTON, SOUTH CAROLINA.

COMBINED COTTON-PLANTER AND FERTILIZER-DISTRIBUTER.

No. 827,328.              Specification of Letters Patent.       Patented July 31, 1906.

Application filed June 12, 1905. Serial No. 264,831.

*To all whom it may concern:*

Be it known that I, AIKEN C. TAYLOR, a citizen of the United States, residing at Charleston, in the county of Charleston, State of South Carolina, have invented new and useful Improvements in a Combined Cotton-Planter and Fertilizer-Distributer, of which the following is a specification.

My invention relates to improvements in agricultural machines, the objects being to produce a machine designed to and capable of successively and in one and the same operation dropping fertilizer, forming the bed, opening the bed, depositing the cotton-seed, and subsequently covering the same, and to accomplish this, as before stated, in a single operation and by the use of a very simple and economically-constructed machine.

Other objects and advantages of the invention will hereinafter appear, and the novel features thereof will be particularly pointed out in the claims.

Referring to the drawings, Figure 1 is a side elevation of a combined cotton-planter and fertilizer-distributer constructed in accordance with my invention. Fig. 2 is a horizontal sectional view of the same on the line 2 2 of Fig. 1. Fig. 3 is a longitudinal sectional view of the machine on line 3 3 of Fig. 2, the front framework being broken away, as well as the shovels and their standards; and Figs. 4 and 5 are details in plan hereinafter referred to.

Similar numerals of reference indicate similar parts throughout the drawings.

In carrying out my invention I employ a front frame constructed of light steel and comprising a pair of opposite parallel beams 1, which beams at their rear ends terminate in downwardly-disposed standards 2 for the accommodation of opposite half-shovels 3. The beams at their front ends converge, forming an eye 5, which is swiveled on a vertical spindle 6, formed on a caster-frame 4, carrying a caster-wheel 7, designed to run in the bottom of a furrow, as hereinafter described. The caster-frame 4 is also formed with a clevis 8, which may be provided with a series of holes for connection with in an adjustable manner the usual draft appliance.

Pivoted by transverse trunnions or bolts 9 in the front frame just descibed is a platform 10, the said platform being supported at its rear end by ground-wheels 11, mounted to revolve on a transverse fixed axle 12. One of the ground-wheels is provided with a main sprocket 13. The axle 12 may have connected thereto a pair of drag-bars 14, the rear ends of said bars being axially and loosely connected with a roller or other form of drag 15.

Upon the front end of the platform is mounted a fertilizer-hopper 16, and upon the rear end a cotton-seed hopper 17. Between the two hoppers I may arrange an inverted-U-shaped frame or support 18 and upon this a box 19 for the reception of tools used in connection with the machine.

The center of the platform may be formed with an opening 20, and supported therein in an adjustable manner is a plow-standard 21, carrying a bull-tongue plow 22. For the purpose of adjusting the plow and its standard the latter may be provided with a series of holes 23, into any one of which above the platform a cross pin or bolt 24 may be inserted.

Rising from the platform at either side and at its rear end are standards 25, and rigidly secured in the upper ends thereof are handles 26. Such rigidity may be secured in any desired manner, but preferably by means of a shoulder 27, formed in each standard 25 near its upper end and by a bolt 28, which passes through the handle 26 and the standard above the shoulder. To each of the beams 1 there is pivoted by a bolt 29 an L-shaped link 30, having a series of perforations 31 formed therein. In any one of these perforations the front ends of the handles 26 may be connected by bolts 32. It will be observed that by changing the points of connection into the various perforations 31 the platform and the frame supporting the same may be disposed at various angles and in this manner the plows 3 and 22 raised and lowered, so as to alter the depth of their penetration, and hence the bed formed thereby. Each of the hoppers 16 and 17 may be removably mounted on the platform and held in position thereon by any suitable means— as, for instance, hooks and eyes 33—the former being pivotally connected to the sides of the platform and at their free ends connected with suitably-located eyes projecting from the sides of the hoppers.

Mounted transversely in the cotton-seed hopper 17 is a shaft 34, which projects at one side beyond the wall of the hopper and is there provided with a sprocket-wheel 35. Within the hopper the shaft 34 is provided with curved and radiating stirring-arms 36, arranged at each side of the center of the shaft, and between said arms at the center of the shaft the same is provided with a star-shaped feed-wheel 37. Below the shaft and wheel a feed-plate 38 is located, the same having at its front end an enlarged opening 39 (see Fig. 2) and a rear narrow slot 40 connected therewith, into which opening and slot the points of the star-shaped feed-wheel enter, thus forcing the cotton-seed through the opening 39 and down through a corresponding opening 41, formed in the platform in a manner obvious.

The platform 10 opposite the center of the fertilizer-hopper 16 has journaled therein a short vertical shaft 42, the same carrying at its lower end a beveled gear 43, which meshes with and is driven by a companion gear 44, (see dotted lines, Fig. 2,) mounted at the inner end of a short horizontal shaft 45, which projects beyond the platform and the beams 1, at which latter point the shaft 45 carries a sprocket 46. Arranged over the sprockets 13, 35, 46 and an idler 47 projecting from a stub-shaft on the platform 10 is a driving sprocket-chain 48, the same receiving motion from the drive-sprocket 13 and imparting rotary motion through the sprockets 35 and 46 to the shafts 34 and 45.

A plate 49 (see Fig. 5) is mounted in the bottom of the fertilizer-hopper 16, is provided on its upper side with a ring 50, a central opening 51 for the shaft 42, and a feed-opening 52. Mounted upon the shaft 42 and adapted to move therewith is a feed-wheel 53, (see Fig. 4,) the same having a series of radial inclined blades 54, adapted to deliver fertilizer to the feed-opening 52, the fertilizer dropping from said opening through the chute 55 to the bottom of the furrow. A plate 56 (see Figs. 2 and 3) is arranged over the wheel 53 and is provided with a central opening for the shaft 42 to pass through and with a series of segmentally-disposed slots 57. Above this plate the shaft 42 may be provided with a horizontally-disposed stirring-arm 58.

The operation of the invention may be briefly described as follows: The caster 7, traveling along at the bottom of the furrow already formed, supports the front end of the machine, while the rear end is supported by the ground-wheels 11, traveling at either side of the furrow. The fertilizer is dropped into the bottom of the furrow in rear of the caster-wheel, after which the two half-plows form the bed, or, in other words, closes the furrow, so that the fertilizer is thoroughly covered and deposited below the point where the cotton-seed is to be deposited. Immediately in rear of the two half-shovels follows the bull-tongue plow 22, which opens the bed into which is dropped the cotton-seed, after which the bed is closed and the cotton-seed covered by the drag 15. Thus it will be seen that the entire operation is successively conducted by the single machine.

Various changes may be made in the details of my invention, and I would therefore have it understood that I do not limit myself to the precise details herein shown and described, but claim that I may vary the same to any extent within the knowledge of the skilled mechanic.

Having described my invention, what I claim is—

1. In a machine of the class described, the combination, of a support, wheels therefor, a fertilizer-hopper arranged at the front end of the machine, a cotton-seed hopper at the rear end thereof, a U-shaped support arranged on the frame between the two hoppers, and a tool-box arranged on said U-shaped support.

2. In a machine of the class described, the combination, of a supporting-frame, a front fertilizer-hopper, a rear cotton-seed hopper, an intermediate U-shaped frame, a tool-box supported thereby and between the two hoppers, and a plow-carrying standard arranged adjustably in the frame and extending upwardly within the U-shaped support.

3. In a machine of the class described, the combination with a front divided frame terminating in plow-beams, a platform pivotally connected to the frame, a caster for supporting the frame, rear supporting-wheels for the platform, and means for adjustably connecting the rear end of the frame and the platform.

4. The combination, in a machine of the class described, of a front framework, a caster supporting the same, a rear frame or platform connected to said front frame, supporting-wheels for said rear frame or platform, opposite handles mounted rigidly on the rear frame or platform, and means for connecting the rear end of the front frame adjustably with said handles.

5. In a machine of the class described, the combination, of a divided front frame having its sides terminating in shovel-carrying beams, a platform or framework pivoted at its front end to said front frame, ground-wheels for supporting the platform or frame, planter-carrying mechanism mounted on the platform, standards rising from the platform or frame, handles rigidly mounted on said standards, and links pivotally connected to the front ends of the handles and to the rear ends of the divided front frame.

6. In a machine of the class described, the combination, of a divided front frame having its sides terminating in shovel-carrying beams, a platform or framework pivoted at its front end to said front frame, ground-wheels for supporting the platform or frame, planter-carrying mechanism mounted on the platform, standards rising from the platform or frame, handles rigidly mounted on said standards, L-shaped links pivotally connected at their lower ends to the shovel-carrying standards of the divided front frame and provided with a series of perforations, and bolts for connecting the front ends of the handles with said links.

7. In a machine of the class described, the combination with a front divided frame having a supporting-caster and its rear ends terminating in downwardly-disposed standards, half-shovels carried thereby, a rear framework or platform connected to the frame, rear supporting-wheels therefor, front and rear hoppers, operating-shafts for the feed mechanisms thereof, sprockets for said shafts, a main sprocket carried by one of the supporting-wheels, a drive-chain connecting the series of sprockets, a central standard having a plow arranged in rear of the half-shovels, and handles for the machine.

In testimony whereof I have signed my name to this specification in the presence of two subscribing witnesses.

AIKEN C. TAYLOR.

Witnesses:
E. A. LAWRENCE,
G. LEONARD LAWRENCE.